US010284944B1

(12) United States Patent
Steinkilberg

(10) Patent No.: US 10,284,944 B1
(45) Date of Patent: May 7, 2019

(54) SOUND GENERATING DEVICE AS WELL AS VEHICLE EXHAUST SYSTEM

(71) Applicant: Faurecia Emissions Control Technologies, Germany GmbH, Augsburg (DE)

(72) Inventor: Hannes Steinkilberg, Augsburg (DE)

(73) Assignee: Faurecia Emissions Control Technologies, Germany GmbH (DE)

( * ) Notice: Subject to any disclaimer, the term of this patent is extended or adjusted under 35 U.S.C. 154(b) by 0 days.

(21) Appl. No.: 16/196,316

(22) Filed: Nov. 20, 2018

(30) Foreign Application Priority Data

Nov. 21, 2017 (DE) .......................... 10 2017 127 454

(51) Int. Cl.
*H04R 1/28* (2006.01)
*G10K 15/02* (2006.01)
*H04R 1/02* (2006.01)
*B60R 11/02* (2006.01)
*F01N 1/06* (2006.01)
*B60Q 5/00* (2006.01)
*G10K 11/178* (2006.01)

(52) U.S. Cl.
CPC ........ *H04R 1/2826* (2013.01); *B60R 11/0217* (2013.01); *F01N 1/065* (2013.01); *G10K 15/02* (2013.01); *H04R 1/025* (2013.01); *B60Q 5/00* (2013.01); *G10K 11/178* (2013.01); *G10K 2210/1282* (2013.01); *H04R 2499/13* (2013.01)

(58) Field of Classification Search
None
See application file for complete search history.

(56) References Cited

U.S. PATENT DOCUMENTS 5,119,902 A * 6/1992 Geddes ................... F01N 1/065
181/156
5,466,899 A * 11/1995 Geisenberger .......... F01N 1/065
181/206
7,293,627 B2 * 11/2007 Kruger .................... F01N 1/006
181/206

(Continued)

FOREIGN PATENT DOCUMENTS

DE 202008008322 U1 9/2008
EP 1452066 A1 9/2004
EP 2293288 A1 3/2011

OTHER PUBLICATIONS

German Search Report for German Application No. 10 2017 127 454.5 dated Jul. 24, 2018.

*Primary Examiner* — Paul W Huber
(74) *Attorney, Agent, or Firm* — Carlson, Gaskey & Olds, P.C.

(57) ABSTRACT

A sound generating device for a vehicle exhaust system has a housing, a sound generator located in the housing, a housing wall that comprises an opening for the sound generator, and a sound channel that extends in the housing. The sound generator is mounted to a shoulder section of the opening such that the opening is closed by the sound generator and a front side and a rear side of the sound generator are assigned to different sides of the opening. The sound channel acoustically connects the rear side of the sound generator with the front side of the sound generator. The opening and the sound generator comprise a central axis and the sound channel runs at least partially around the central axis.

20 Claims, 4 Drawing Sheets

(56) References Cited

U.S. PATENT DOCUMENTS

| | | | | |
|---|---|---|---|---|
| 7,533,759 | B2* | 5/2009 | Krueger | F01N 1/065 |
| | | | | 181/206 |
| 9,206,717 | B2* | 12/2015 | Kruger | F01N 13/1888 |
| 9,394,812 | B2* | 7/2016 | McNelis | F01N 1/02 |
| 9,416,700 | B2* | 8/2016 | Nording | B60K 13/04 |
| 9,728,176 | B2* | 8/2017 | Keck | G10H 5/10 |
| 9,978,356 | B2* | 5/2018 | Koch | G06F 3/165 |
| 10,017,008 | B1* | 7/2018 | Chang | H04R 1/345 |
| 2014/0321659 | A1* | 10/2014 | Buganza | F01N 1/065 |
| | | | | 381/71.4 |
| 2014/0328493 | A1* | 11/2014 | Wirth | H04R 1/028 |
| | | | | 381/86 |
| 2015/0159527 | A1* | 6/2015 | Nording | B60K 13/04 |
| | | | | 181/206 |

* cited by examiner

SOUND GENERATING DEVICE AS WELL AS VEHICLE EXHAUST SYSTEM

CROSS-REFERENCE TO RELATED APPLICATIONS

This application claims priority to DE 10 2017 127 454.5, filed 21 Nov. 2017.

FIELD OF INVENTION

The disclosure concerns a sound generating device for a vehicle exhaust system of a motor vehicle as well as a vehicle exhaust system with at least one sound generating device.

BACKGROUND OF THE INVENTION

In the case of modern motor vehicles, the provision of sound generating devices in vehicle exhaust systems is known to be capable of influencing the engine noise of the internal combustion engine of a vehicle.

Such sound generating devices are intended, in particular, to generate low-frequency noises, for instance, to attenuate engine noise. Increasing the size of sound generator or the loud speaker would be conceivable to make the generation of low frequencies with greater sound pressure possible.

However, the construction space in a vehicle is limited so that the sound generating device has to be designed as compactly as possible. Increasing the size of loudspeaker is therefore not an option.

Thus, there is a need to provide a sound generating device as well as a vehicle exhaust system that are not only built compactly and require little construction space, but are also capable of generating low-frequency vibrations and tones with a high sound pressure.

SUMMARY OF THE INVENTION

A sound generating device for a vehicle exhaust system comprises a housing, a sound generator located in the housing, in particular a loudspeaker, a housing wall comprising an opening for the sound generator, and a sound channel that extends in the housing. The sound generator is attached to a shoulder section of the opening such that the opening is closed by the sound generator. A front side and a rear side of the sound generator are assigned to different sides of the opening and the sound channel connects acoustically the rear side of the sound generator to the front side of the sound generator. The opening and/or the sound generator comprises or comprise a central axis and the sound channel runs at least partially around the central axis.

Low-frequency tones and noises can be amplified through the sound channel, with a certain minimum length of sound channel being required. However, this minimum length is usually longer than the length of the housing in any of its dimensions. Owing to the configuration of the sound channel around the central axis, a sound channel is provided that has the necessary minimum length and nevertheless does not increase the construction space required for the sound generating device. For example, the sound channel can run fully within the housing.

In general, the sound channel provides a path for the sound waves generated by the sound generator, said sound waves propagating along this path in an intended direction of propagation. In this respect, the sound waves propagating though the sound channel propagate substantially perpendicular to the central axis as the sound channel mainly extends around the central axis of the sound generator or of the opening within the housing. As a result, the sound generating device is compactly designed accordingly.

The phrase "extending around the central axis of the sound generator or of the opening" means, inter alia, that the sound channel extends in a plane that is substantially parallel to the plane in which the opening is located, wherein the sound channel encloses the opening at least partially. The sound channel thus runs via a certain range of angles around the opening.

The sound channel preferably extends not only in a straight line. For instance, the sound channel comprises rounded corners that ensure that the sound waves propagate through the sound channel mainly in the intended direction of propagation without being reflected back on the edges or corners of the sound channel.

Within the scope of this disclosure, an "acoustic connection" is understood to mean that the airborne sound waves can travel between the connected spaces, wherein a passively vibrating membrane excited by the airborne sound waves does not interrupt the acoustic connection. The "acoustic connection" can also be termed "acoustic coupling".

The sound channel connects the rear side of the sound generator with the front side of the sound generator, in particular, exclusively within the sound generating device or the housing and not via the surrounding environment of the sound generating device or the housing. Thus, within the scope of this disclosure, the term "acoustic connection" does not include, in particular, connections with sound paths that extend—also partially—into the surrounding environment of the sound generating device or the housing.

For instance, the sound generator is attached on a side of the opening on the housing wall and does not extend, therefore, through the opening.

The sound channel is delimited, for example, by a bottom side of the housing wall so that the sound channel is provided on the side of the housing wall facing away from the rear volume. The sound channel can thus extend mainly, in particular fully on the front side of the loud speaker.

In the horizontal section, the housing is, for instance rectangular, in particular quadratic. The corners of the rectangle may be rounded.

Preferably, the sound channel is a bass reflex tube, thus enabling the sound pressure generated by the sound generator to be amplified at low-frequency vibrations.

To achieve the necessary minimum length, the sound channel can comprise at least a curved and/or angled section.

In an embodiment of the disclosure, the housing comprises a front volume, at which the front side of the sound generator is directed, and a rear volume, at which the rear side of the sound generator is directed, wherein a sound channel acoustically connects the rear volume with the front volume, thus effectively increasing the sound pressure.

For this purpose, the sound generator may be located mainly in the rear volume.

For example, the sound channel extends around the front volume and/or the front volume is encompassed at least in part, in particular mostly by the sound channel in a plane.

For instance, the front volume has a central axis, wherein the sound channel at least in part extends around the central axis of the front volume. In this way, the sound channel can be designed without restricting the size of the front volume.

To separate the front volume and the rear volume without any additional components, the housing wall can separate the front volume from the rear volume.

To save on additional components, it is possible that the sound channel extends in a peripheral region of the housing, for instance, between a housing exterior wall and the opening.

In an embodiment variant, the housing comprises an upper part and a bottom part, wherein the bottom part has the housing wall and a trough-shaped area. The opening is substantially closed on the side of housing wall facing away from the rear volume by the trough-shaped area. Thus, the installation of the sound generator is simplified.

The upper part can take the form of a cap that is positioned on the bottom part so that the rear volume is enclosed by the upper part and the housing wall. The upper part in the form of a cap can also be termed a cover.

The interior volume may be limited by the trough-shaped area and the sound generator in the opening.

Preferably, the sound generator is provided on the bottom part, in particular on the side of the housing wall facing away from the rear volume, thus simplifying the installation further.

In doing so, the sound channel, the housing wall, and the trough-shaped area may be formed together as a single piece.

The entire bottom part can be realized as a single piece.

To easily couple the sound generator to the vehicle exhaust system, the housing may comprise an output channel for acoustically connecting the sound generator with an exhaust pipe of the vehicle exhaust system, wherein the output channel extends from the front volume, in particular, wherein the sound channel opens into the output channel.

For instance, the housing has a bottom side, wherein the sound channel, the output channel, and/or a base of the trough-shaped area is or are substantially parallel to the bottom side, in particular wherein the sound channel, the output channel, and/or a base of the trough-shaped area extends or extend from the bottom side. It is thus possible to provide the housing as a compact assembly with a defined external contour.

The bottom side does not have to be continuous, but rather the bottom side may be regarded as a plane that delimits the housing.

In an embodiment of the disclosure, the housing wall is arranged at an angle relative to the bottom side, thus enabling the sound emission of the sound generator to be improved.

To further improve the sound emission, the output channel can extend on the side of the opening from the front volume that is furthest away from the bottom side.

In an embodiment of the disclosure, the sound channel runs around the central axis in a range of angles of at least 90°, in particular at least 180°, particularly preferably at least 270°. In this way, the length of the sound channel can be chosen independently of the side length of the housing. The sound channel may have mostly an L, C, or U form in a top view.

In addition, a vehicle exhaust system includes at least one sound generating device according to the disclosure and at least one exhaust pipe, wherein the sound generator of the sound generating device is acoustically coupled with the exhaust pipe.

For instance, the output channel of the sound generating device opens into the exhaust pipe.

BRIEF DESCRIPTION OF THE DRAWINGS

Additional features and advantages of the disclosure can be found in the following description as well as the attached drawings to which reference is made. In the drawings.

DETAILED DESCRIPTION

Figure 1:
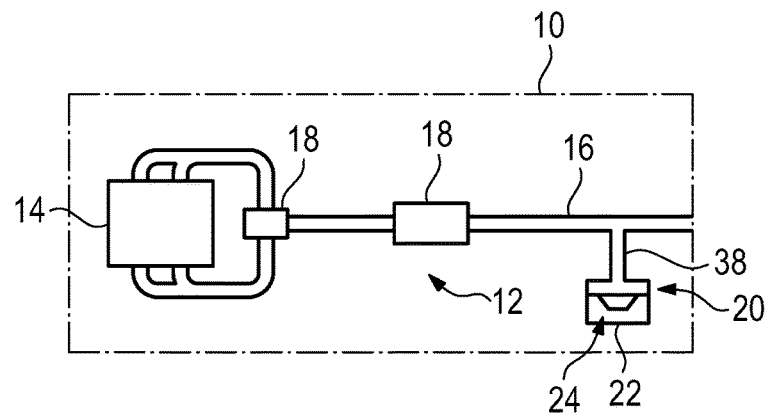
FIG. 1 shows schematically a vehicle exhaust system according to the disclosure with a sound generating device according to the disclosure.

In FIG. 1, a motor vehicle 10 is schematically shown with a vehicle exhaust system 12. The vehicle exhaust system 12 directs exhaust gas generated by the internal combustion engine 14 of the motor vehicle 10 into the surrounding environment of the motor vehicle 10.

To this end, the vehicle exhaust system 12 comprises at least an exhaust pipe 16 and various exhaust treatment devices 18, for example, particulate filter, catalytic converter and/or muffler.

Moreover, the vehicle exhaust system 12 has a sound generating device 20.

The sound generating device 20 comprises a housing 22 and a sound generator 24, for example a loud speaker.

The sound generator 24 is positioned in the housing 22 and is enclosed by the housing 22 so that it is protected from external environmental influences.

The sound generating device 20 is acoustically connected with the exhaust pipe 16 so that the sound generated by the sound generator 24 can interact with the sound in the exhaust pipe 16.

The sound generating device 20 is, for instance, part of an active silencer for reducing exhaust noise. In the case of such active silencers, the sound generator 24 generates noise which is in phase opposition to the engine noise coming from the internal combustion engine 14. The noise coming from the sound generator 24 then interferes with the engine noise in the exhaust pipe 16, thus suppressing, or at least attenuating, the engine noise.

Such a sound generating device 20 may also be used to change engine noise, by using the sound generator 24 to generate additional noise that can be added to the engine noise. For example, the noise of a sportier engine can thus be imitated.

Figure 2:
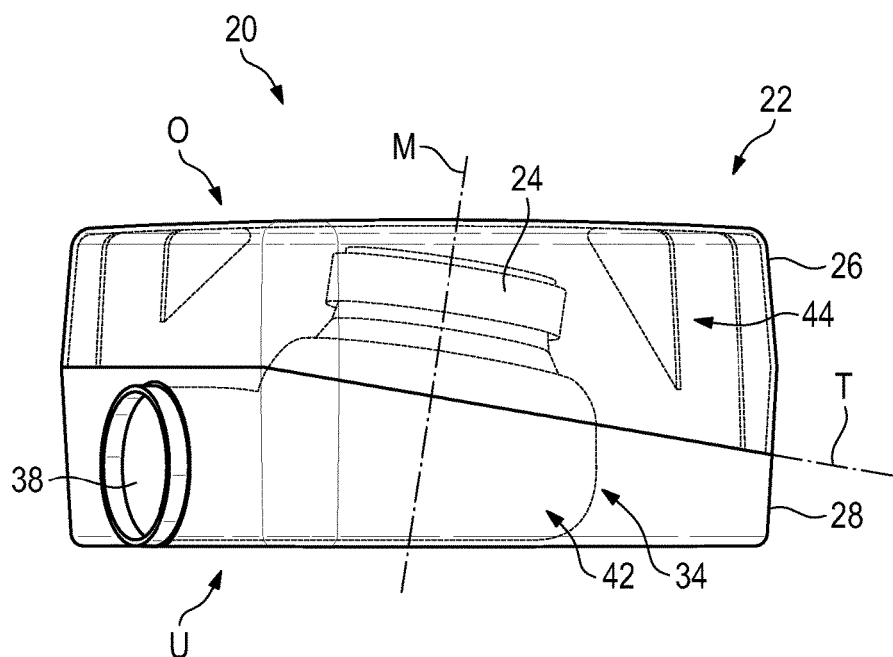
FIG. 2 shows the sound generating device of the vehicle exhaust system according to the disclosure according to FIG. 1 in a perspective, partially transparent view.
Figure 3:
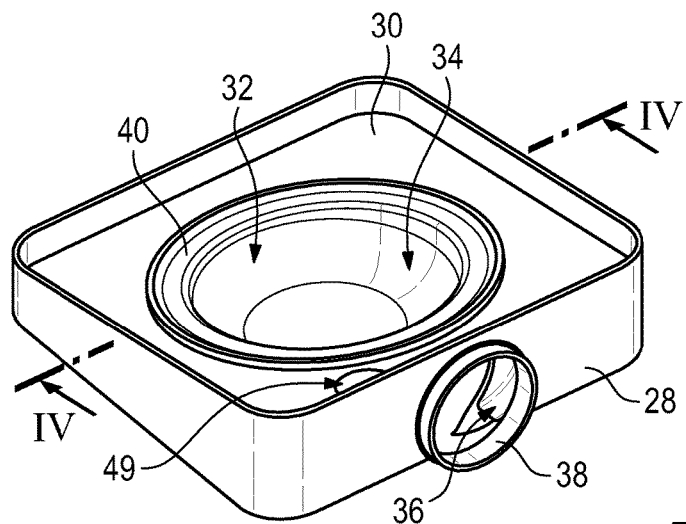
FIG. 3 shows a perspective view of the bottom side of the housing of the sound generating device according to FIG. 2.
Figure 4:
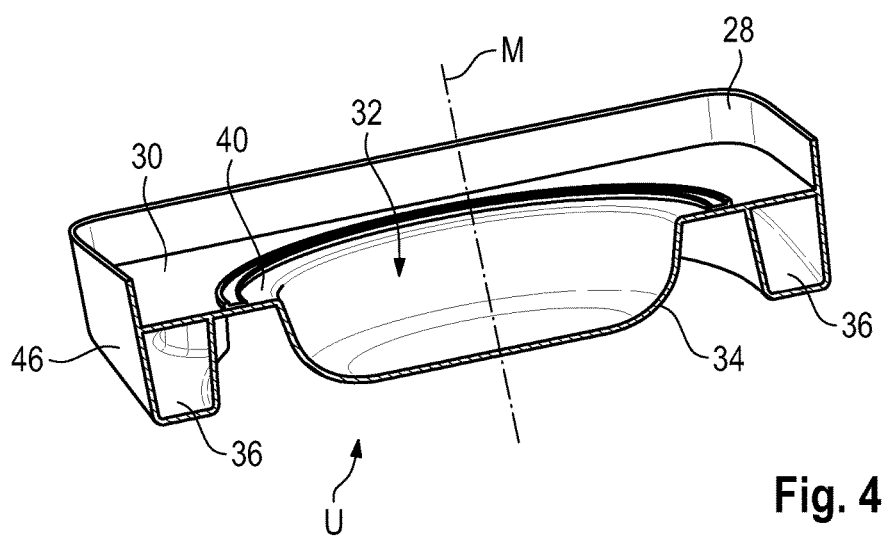
FIG. 4 shows a section through the bottom part according to FIG. 3 along the plane IV-IV.
Figure 5:
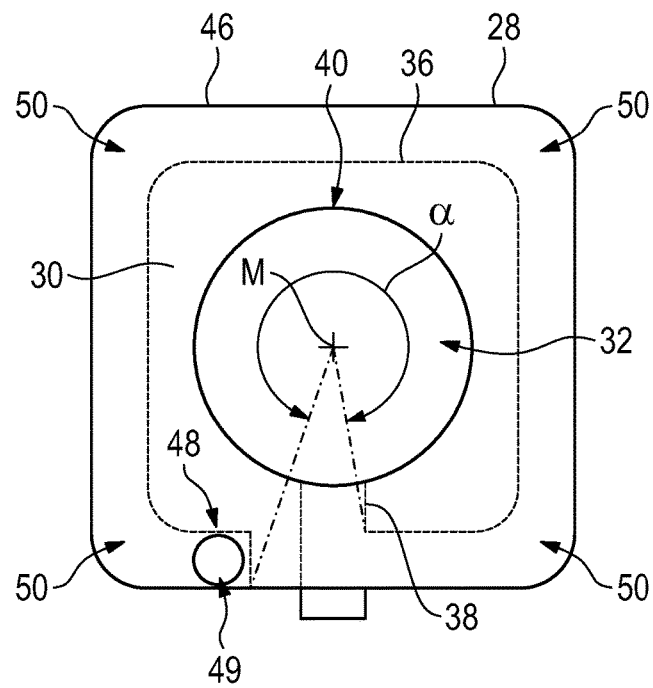
FIG. 5 shows a simplified top view of the bottom part according to FIG. 3.

In FIG. 2, the housing 22 is shown in a perspective view. The housing 22 comprises an upper part 26 illustrated partially transparently and a bottom part 28. The bottom part 28 is shown in FIGS. 3 to 5 separately.

Collectively, the upper part 26 and the bottom part 28 form the outer casing of the housing 22, which is more or less cuboid in form in the shown embodiment and has a quadratic external contour in a horizontal section (FIG. 5), i.e. a section parallel to the partition plane T of the upper part 26 and the bottom part 28. The corners of the quadratic external contour may be rounded.

It is, of course, also conceivable that the outer casing or the housing 22 is entirely spherical or has another form.

The interior of the housing 22 is limited by the outer casing, in which the sound generator 24 is provided.

To this end, the upper part 26 and the bottom part 28 are realized as mutually corresponding counterparts, for instance as half shells.

However, it is also conceivable that an adapter is provided between the upper part 26 and the bottom part 28 in order to connect the upper part 26 with the bottom part 28.

In the shown embodiment, the upper part 26 is only realized as a cap or cover that is placed on the bottom part 28.

The housing 22 has an upper side O that is formed by the upper part 26 and a bottom side U that is formed by the bottom part 28. The upper side O is parallel to the bottom side U.

The upper side O is a continuous surface, whereas the bottom side U in the shown embodiment is not continuous, but can be regarded as a plane (cf. FIG. 4)

The partition plane T, at which the upper part 26 rests on the bottom part 28, is arranged at an angle in comparison to the upper side O and the bottom side U, i.e. that the bottom side U particularly includes an angle greater than zero with the partition plane T, as clearly evident in FIG. 3.

The bottom part 28 comprises a housing wall 30 with an opening 32, a trough-shaped area 34, a sound channel 36 and an output channel 38.

The bottom part 28 is preferably formed as a single piece, for instance as an injection moulded part. The housing wall 30, the trough-shaped area 34, the sound channel 36 and the output channel 38 are then formed together as a single piece.

The housing wall 30 is provided substantially parallel to the partition plane T, as can be seen in particular in FIGS. 3 to 5. The housing wall 30 is thus arranged at angle to the bottom side U.

The opening 32 for the sound generator 24 is located centrally in the housing wall 30 and has a central axis M that is also the central axis of the sound generator 24.

The central axis M is perpendicular to the housing wall 30 and the partition plane T.

A shoulder section 40, on which the sound generator 24 rests at least on the edge or through which the sound generator is attached to the bottom part 28, is provided around the opening 32 on the housing wall 30. As a result, the sound generator 24 closes the opening 32.

The front side of the sound generator 24 is assigned through the opening to the underside of the housing wall 30 or the opening 32, i.e. the side of the housing wall 30 or the opening facing the bottom side U. At the same time, the rear side of the sound generator 24 is assigned to the upper side of the housing wall 30 or of the opening 32, i.e. the side of the housing wall 30 or of the opening 32 facing the upper side O of the housing 22.

Through the housing wall 30 and the sound generator 24 located at the opening 32, the interior space of the housing 22 is thus divided into a front volume 42 and a rear volume 44, which are assigned to the front side and the rear side of the sound generator 24.

The rear volume 44 is delimited on the one hand by the upper part 26 and on the other hand by the housing wall 30, wherein the sound generator 24 can be located fully in the rear volume 44.

The front volume 42 is delimited toward the upper side by the sound generator 24 and to the other side by the bottom part 28, more specifically the trough-shaped area 34 of the bottom part 28.

In a top view, the trough-shaped area 34 closes the opening 32 on the bottom side of the housing wall 30.

The trough-shaped area 34 thus forms the front volume 42 and both also have a central axis that corresponds to central axis M of the opening 32.

The trough-shaped area 34 connects directly to the housing wall 30, in particular, the housing wall 30 transitions directly on the opening 32 into the trough-shaped area 34.

The output channel 38 goes from the front volume 42 and extends outwardly through an exterior wall 46 of the bottom part 28. The exterior wall is, for example, part of the outer casing of the housing 22.

The output channel 38 finally opens into the exhaust pipe 16. Via the output channel 38, the sound generator 24 and the front volume 42 are thus acoustically coupled with the exhaust pipe 16.

For instance, the output channel 38 extends on the side of the trough-shaped area 34, at which the distance between the housing wall 30 and the bottom side U is the greatest.

The bottom of the trough-shaped area 34 and the output channel 38 are parallel to the bottom side U and form a part of the bottom side U.

The sound channel 36 is provided to acoustically connect the front volume 42 with a rear volume 44.

The sound channel 36 is among other things limited by the bottom side of the housing wall 30 so that the sound channel 36 is provided on the side of the housing wall 30 facing away from the rear volume 44.

As can be seen in FIG. 5, the start 48 of the sound channel 36 begins offset slightly clockwise from the output channel 38, wherein no acoustic connection exists at this point between the sound channel 36 and the output channel 38.

In the shown embodiment, originating from the start 48 of the sound channel 36, the sound channel 36 runs along the exterior wall 46 and around the opening 32, the trough-shaped area 34 and the sound generator 24, in particular in a plane that is substantially parallel to the plane in which the opening 32 is provided.

The sound channel 36 thus runs around the central axis M until the sound channel 36 finally meets the output channel 38 again and opens into the output channel 38 there.

Of course, the sound channel 36 can also run anticlockwise.

The sound channel 36 thus covers a range of angles α around the central axis M that is greater than 180°, in particular greater than 270°.

In the view shown in FIG. 5 which illustrates a projection of the sound channel 36, the opening 32 and the trough-shaped area 34, it can be discerned easily that the sound channel 36 extends fully outside the trough-shaped area 34, the opening 32 and the sound generator 24 within the housing 22.

The sound channel 36 thus extends in the peripheral region of the housing 22 and comprises curved sections 50 on the rounded corners of the housing 22, said sections preventing the sound waves from being reflected.

This ensures that the sound channel 36 provides a path for the sound waves generated by the sound generator 24, said sound waves propagating along this path in an intended direction of propagation. As the sound channel 36 mainly extends around the central axis M of the sound generator 24 or the opening 32 within the housing 22, a suitably long path is created for the sound waves within the housing 22, even though the housing is designed compactly.

A connection opening 49, through which the sound channel 36 is connected to the rear volume 44, is provided in the housing wall 30 in the area of the start 48 of the sound channel 36 to acoustically connect the sound channel 36 with the rear volume 44.

The connection opening 49 is thus located slightly offset clockwise to the output channel 38 in the shown embodiment.

The rear volume 44 is acoustically connected with the front volume 42 and the exhaust pipe 16 through the sound channel 36 that opens into the output channel 38.

An acoustic connection is understood to mean in this case that the airborne sound waves can travel from the rear volume 44 into the front volume 42 and the exhaust pipe 16, wherein a passively vibrating membrane, which can be located for instance in the sound channel 36, is not considered to be an interference for an acoustic connection, even though such a membrane does not let air pass.

Through this connection of the rear volume 44 to the front volume 42 and the exhaust pipe 16, the sound channel 36 forms a bass reflex tube with a length that is considerably greater than the side length of the housing 22.

The housing 22 and the entire sound generating device 20 can thus be designed compactly, while still enabling low tones to be transmitted powerfully.

In particular, it can be discerned in FIG. 4 that the entire bottom part, thus the housing wall 30, the trough-shaped area 34, the sound channel 36 and the output channel 38, are formed together as a single piece, wherein the wall of the sound channel 26 forms the exterior wall 46 at the same time at least partially.

The sound channel 36 is thus delimited by the housing wall 30, the exterior wall 46, the housing wall of the bottom part 28 assigned to the bottom side U as well as a partition wall that is provided between the trough-shaped area 34 and the exterior wall 46.

Figure 6:
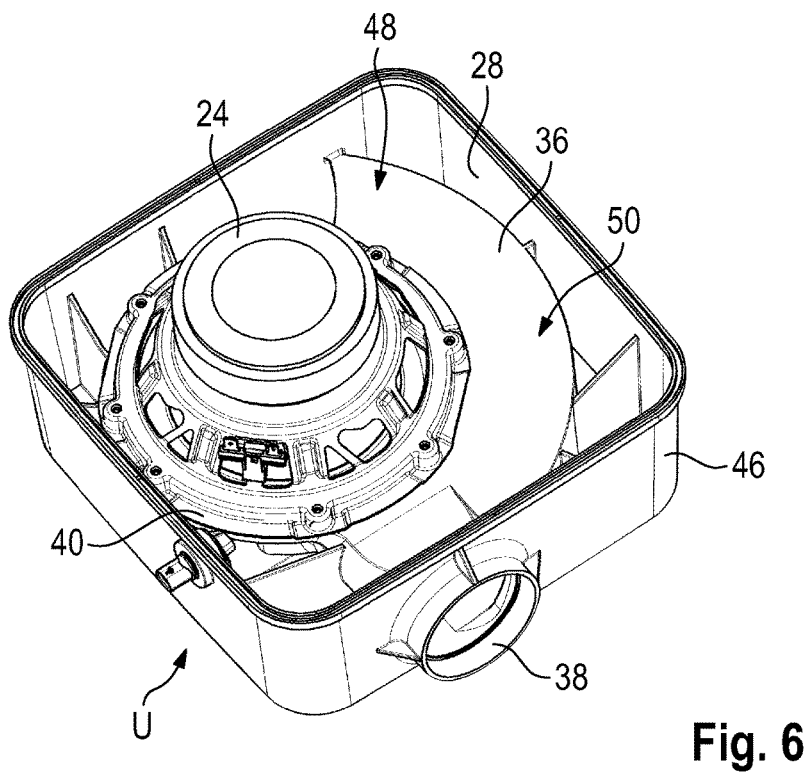
FIG. 6 shows a perspective view of a second embodiment of the sound generating device according to the disclosure.
Figure 7:
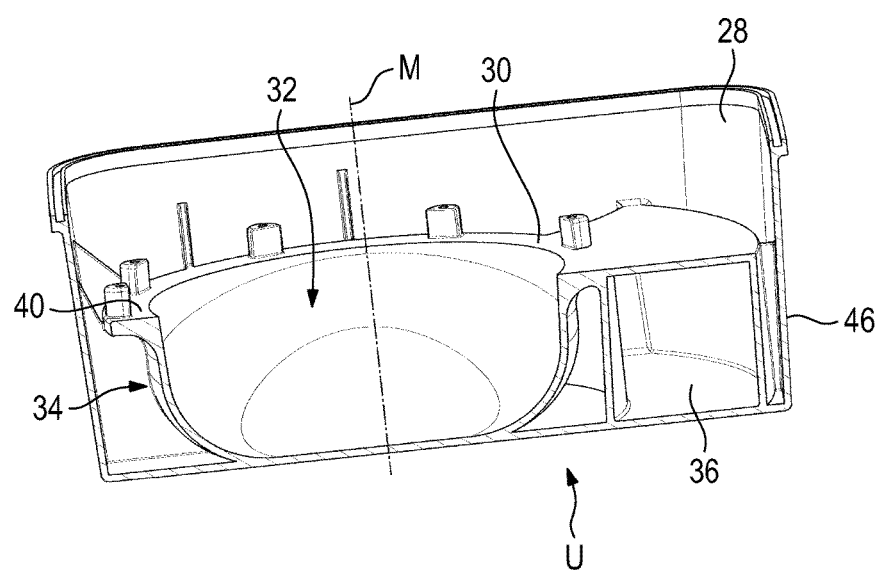
FIG. 7 shows a section through the bottom part of the sound generating device according to FIG. 6.

In FIGS. 6 and 7, a further embodiment of the sound generating device is shown that substantially corresponds to the first embodiment. Therefore, only the differences are discussed hereinafter, wherein the same parts or parts with the same function are provided with the same reference signs.

In FIG. 6, the bottom part 28 is shown with the attached sound generator 24, whereas in FIG. 7, a section through the bottom part 28 is shown.

In the second embodiment, the housing wall 30 does not fully close the bottom part 28. From the housing wall 30, there is however a shoulder section, on which the sound generator 24 is attached, so that the interior volume of the housing 22 is divided into the front volume 42 and the rear volume 44. The rear volume 44 also extends into the bottom part 28 in the embodiment shown.

To close the rear volume 44 despite the reduced housing wall 30, the bottom side U is formed continuously, thus limiting the rear volume 44 on the bottom side U.

Furthermore, the sound generator 36 in the second embodiment is not located on the edge or the exterior wall 46 of the housing 22, but runs very closely around the opening 32 or the shoulder section 40. The distance between the sound channel 36 and the trough-shaped area 34 is approximately the width of the shoulder section 40.

Another difference of the second embodiment is that the sound channel 36 only extends around the central axis M in a range area a of more than 90°, however less than 180°.

The sound channel 36 then opens laterally from the trough-shaped area 34 into the rear volume 44.

In the second embodiment, the sound channel 36 is delimited by the housing wall 30, the housing wall of the bottom part 28 assigned to the bottom side U as well as two partition walls that are substantially parallel to each other. The partition walls are mostly radially spaced and extend around the trough-shaped area 34.

What is thus common to both embodiments, is that the sound channel 36 is delimited by the housing wall 30 and housing wall of the bottom part 28 assigned to the bottom side U.

Further, the sound channel 36 can be limited by at least one partition wall that is adjacent to the trough-shaped area 34. Alternatively, the trough-shaped area 34 can border the sound channel 36 itself, namely with the side opposite the opening 32.

Of course, different features of the various embodiments can be combined with each other as desired.

In particular, it can be clearly discerned by comparing the two embodiments that the length of the sound channel 36 and thus the length of the bass reflex tube can be changed to almost any length to enable precise acoustic tuning. To change the length, for example, the distance between the trough-shaped area 34 and the sound channel 36 can be changed. The range of angles $\alpha$, along which the sound channel 36 extends, can also be adjusted so that the length of the sound channel 36 is adjusted.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A sound generating device for a vehicle exhaust system, comprising:
   a housing;
   a sound generator located in the housing;
   a housing wall that comprises an opening for the sound generator; and
   a sound channel that extends in the housing, wherein the sound generator is attached to a shoulder section of the opening such that the opening is closed by the sound generator, and a front side and a rear side of the sound generator are assigned to different sides of the opening, and wherein the sound channel acoustically connects the rear side of the sound generator with the front side of the sound generator, and wherein at least one of the opening and the sound generator comprises a central axis and the sound channel runs at least partially around the central axis.

2. The sound generating device according to claim 1, wherein the sound generator is a loudspeaker.

3. The sound generating device according to claim 1, wherein the sound channel is a bass reflex tube.

4. The sound generating device according to claim 1, wherein the sound channel comprises at least one of a curved and an angular section.

5. The sound generating device according to claim 1, wherein the housing comprises a front volume, at which the front side of the sound generator is directed, and a rear volume, at which the rear side of sound generator is directed, wherein the sound channel acoustically connects the rear volume with the front volume.

6. The sound generating device according to claim 5, wherein the front volume comprises a front volume central axis, wherein the sound channel runs at least partially around the front volume central axis.

7. The sound generating device according to claim 5, wherein the housing wall separates the front volume from the rear volume.

8. The sound generating device according to claim 1, wherein the sound channel extends along an edge of the housing.

9. The sound generating device according to claim 5, wherein the housing comprises an upper part and a bottom part, wherein the bottom part has the housing wall and a trough-shaped area, and
   wherein the opening is substantially closed by the trough-shaped area on a side of the housing wall facing away from the rear volume.

10. The sound generating device according to claim 9, wherein the sound channel is provided on the bottom part.

11. The sound generating device according to claim 9, wherein the sound channel is provided on the side of the housing wall facing away from the rear volume.

12. The sound generating device according to claim 5, wherein the housing comprises an output channel that acoustically connects the sound generator with an exhaust pipe of the vehicle exhaust system, wherein the output channel extends from the front volume.

13. The sound generating device according to claim 12, wherein the housing has a bottom side and a trough-shaped area, wherein at least one of the sound channel, the output channel, and a base of the trough-shaped area is or are located substantially parallel to the bottom side.

14. The sound generating device according to claim 13, wherein at least one of the sound channel, the output channel, and a base of the trough-shaped area extends or extend from the bottom side.

15. The sound generating device according to claim 13, wherein the housing wall is arranged at an angle relative to the bottom side.

16. The sound generating device according to claim 15, wherein output channel extends from a side of the opening from the front volume that is furthest away from the bottom side.

17. The sound generating device according to claim 1, wherein the sound channel runs around the central axis in a range of angles of at least 90°.

18. The sound generating device according to claim 17, wherein the sound channel runs around the central axis in a range of angles of at least 180°.

19. A vehicle exhaust system comprising:
   at least one exhaust pipe; and
   at least one sound generating device comprising a housing, a sound generator located in the housing, a housing wall that comprises an opening for the sound generator, and a sound channel that extends in the housing,
   wherein the sound generator is attached to a shoulder section of the opening such that the opening is closed by the sound generator and a front side and a rear side of the sound generator are assigned to different sides of the opening, and the sound channel acoustically connects the rear side of the sound generator with the front side of the sound generator,
   wherein at least one of the opening and the sound generator comprises a central axis and the sound channel runs at least partially around the central axis, and
   wherein the sound generator of the sound generating device is acoustically coupled with the at least one exhaust pipe.

20. The vehicle exhaust system according to claim 19, wherein an output channel of the sound generating device opens into the at least one exhaust pipe.

* * * * *